United States Patent

[11] 3,575,382

| [72] | Inventor | Bernard A. Loomans |
| | | Saginaw, Mich. |
| [21] | Appl. No. | 774,107 |
| [22] | Filed | Nov. 7, 1968 |
| | | Division of Ser. No. 608,770, Jan. 12, 1967, Pat. No. 3,423,074 |
| [45] | Patented | Apr. 20, 1971 |
| [73] | Assignee | Baker Perkins Inc. |
| | | Saginaw, Mich. |

[54] MULTIPURPOSE CONTINUOUS MIXING AND/OR KNEADING APPARATUS
3 Claims, 7 Drawing Figs.

[52] U.S. Cl. .................................................. 259/6
[51] Int. Cl. ................................................... B01f 7/04, B01f 7/08
[50] Field of Search ........................................... 259/2, 4, 5, 6, 18, 19, 21, 36, 37, 40, 41, 95, 97; 18/12; 29/23.5, 156.8

[56] References Cited
UNITED STATES PATENTS

| 3,423,074 | 1/1969 | Loomans ...................... | 259/6 |
| 3,446,485 | 5/1969 | Fischer ......................... | 259/6 |

FOREIGN PATENTS

| 865,933 | 4/1961 | Great Britain ................ | 259/6 |
| 1,214,386 | 4/1966 | Germany ...................... | 259/6 |

Primary Examiner—Walter A. Scheel
Assistant Examiner—Leon G. Machlin
Attorney—Learman, Learman and McCulloch

ABSTRACT: This invention relates to mixing and/or kneading machines of a type wherein two or more shafts are journaled in a mixer housing and pairs of radially engaging paddle-shaped sections are provided on the shafts, between a charge opening and a discharge opening, which are driven at the same speed and in the same direction of rotation to homogeneously mix and/or knead a variety of materials, which may be in plastic, liquid, granular or powder form, and are moved continuously in the mixer from the charge opening to the discharge opening.

Patented April 20, 1971 3,575,382
3 Sheets-Sheet 1
FIG. 1
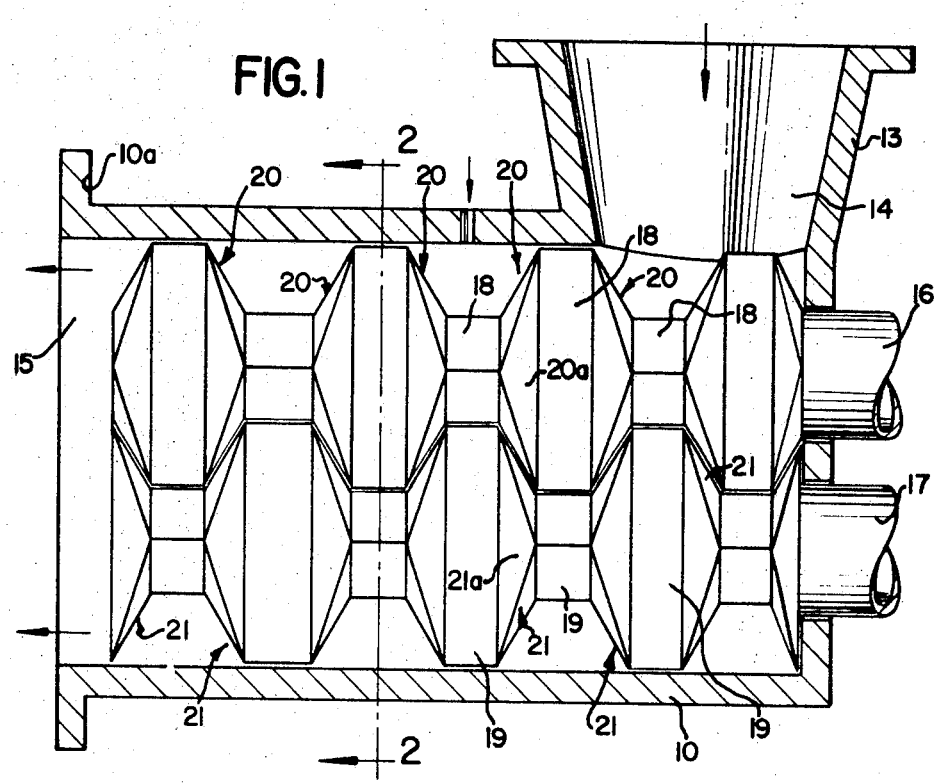
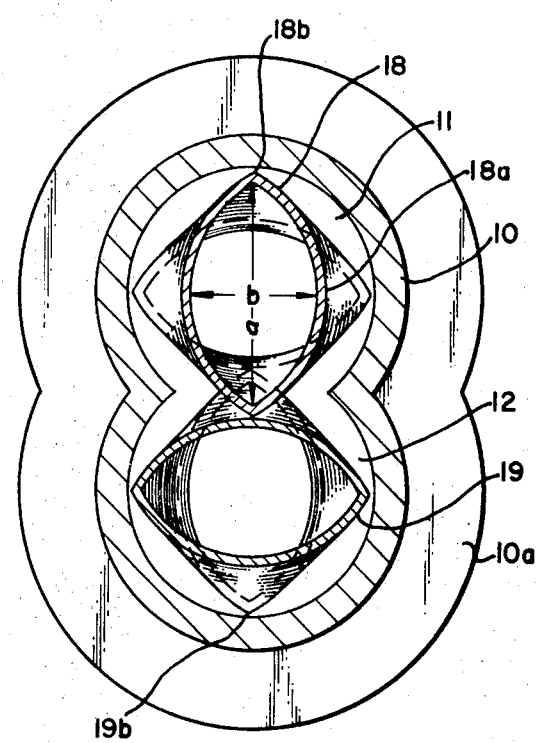
FIG. 2
INVENTOR.
BERNARD A. LOOMANS
BY Learman, Learman & McCulloch INVENTOR.
BERNARD A. LOOMANS
BY
Learman, Learman & McCulloch INVENTOR.
BERNARD A. LOOMANS
BY Learman, Learman & McCulloch

MULTIPURPOSE CONTINUOUS MIXING AND/OR KNEADING APPARATUS

This application is a division of application Ser. No. 608,770, filed Jan. 12, 1967, now U.S. Pat. No. 3,423,074, issued Jan. 21, 1969.

BACKGROUND OF THE INVENTION

A continuous mixer of the aforementioned character forms the subject matter of the present assignee's U.S. Pat. No. 3,195,868, granted Jul. 20, 1965. As the aforementioned patent well illustrates, mixing elements in such a mixer may consist of a plurality of progressively angularly displaced paddles, either straight or formed on a helix, provided in axially abutting relation on the mixing shafts and shaped to continuously wipe the walls of the enclosing housing and also their own radial surfaces so that the surfaces of the mixer are continually wiped clean during the operation thereof. While mixers of this type are well suited to what may be termed the power kneading of plastic substances and subject the materials being mixed to an intense shearing and kneading action, I have discovered that better results can be achieved with some materials if what may be termed transition surfaces are employed between the paddle sections and I have further discovered that shafts of this character may be formed by deforming or bending lengths of tubing and, when in operation in a mixer, will have maximum heat transfer capabilities. An important object of the invention is to provide a method of making such shafts that enables them to be very inexpensively produced and permits them to be manufactured as rigidly as desired by simply gauging the thickness of the tubing which is deformed.

SUMMARY OF THE INVENTION

Briefly, the invention in one aspect thereof is concerned with a method of forming self-cleaning transition surfaces connecting angularly offset, radially engaging mating paddle sections which are provided on two or more mixer shafts.

Other objects and advantages of the invention will be pointed out specifically or will become apparent from the following description when it is considered in conjunction with the appended claims and the accompanying drawings.

BRIEF DESCRIPTION OF THE DRAWINGS

FIG. 1 is a schematic, sectional side elevational view of a mixing or kneading machine formed in accordance with the invention;

FIG. 2 is a transverse sectional view taken on the line 2—2 of FIG. 1;

DESCRIPTION OF THE PREFERRED EMBODIMENTS

Figure 3:
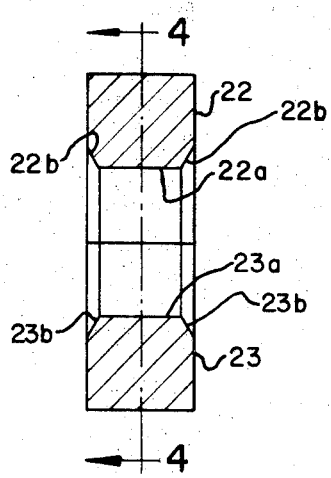
FIG. 3 is a sectional, side elevational view illustrating die elements which may be used to form paddle sections on tubular mixer shafts.
Figure 4:
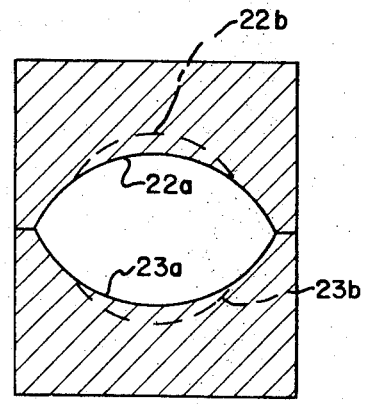
FIG. 4 is a transverse sectional view taken on the line 4—4 of FIG. 3.

Referring now more particularly to the accompanying drawings and, in the first instance, to FIGS. 1—5, a mixer housing, generally designated 10 and in the shape of a figure eight, is shown in FIG. 2 as forming an upper mixing chamber 11 and a lower communicating mixing chamber 12. The mixer housing or casing includes a hopper 13 leading to a material charging opening 14 at one end and the opposite end of casing 10 is open, as at 15, to provide a discharge opening. Commercial machines of this type are disclosed in the aforementioned U.S. patent, wherein a jacketed casing is shown in detail, and it is to be understood that the form of casing illustrated in this application is intended as a schematic representation only, inasmuch as the invention is concerned with the mixing shafts 16 and 17 which are provided to rotate in the chambers 11 and 12, respectively, rather than with the casing. At the discharge end of the casing a flange 10a is provided in FIGS. 1 and 2 to permit the attachment of a discharge housing such as shown in the aforementioned patent, if desired. The shafts 16 and 17 are driven at the same speed and in the same direction of rotation by gears (not shown) which may be driven by a suitable electric motor (not shown) in the usual manner.

Provided on the shafts 16 and 17 are mating pairs of radially interengaging, lenticular mixing and kneading paddle sections 18 and 19, respectively, which are displaced 90° one to the other. Each of the paddle sections 18 and 19 has a major axis $a$ and a minor axis $b$ and each of the sections 18 and each of the sections 19 is respectively angularly displaced 90° from the axially adjacent section 18 or 19 as the case may be. The paddle sections 18 are separated by what may be termed symmetrical transition portions, generally designated 20, and the adjacent paddle sections 19 are similarly separated by identical symmetrical mating transition portions 21. Each transition section 20 and 21 is made up of four symmetric, laterally curvilinear surfaces 20a and 21a, respectively, extending from a flank 18a or 19a, respectively, of a paddle section 18 or 19 to the extremities 18b and 19b, respectively, of the major axis of an adjoining paddle section. As indicated in FIG. 1, the transition sections 20 and 21 are in mating or matched relationship and the curvilinear surfaces 20a and 21a thereof are mating or matching and self-cleaning in the sense that they continually wipe one another.

In FIG. 3 I have shown a pair of mating die sections 22 and 23, each having a central semielliptical surface 22a and 23a, respectively, bounded by flaring side portions 22b and 23b, respectively. The surfaces 22a and 23a, when clamped upon a tubular shaft, form a lenticular paddle section and the adjoining surfaces 22b and 23b form the transition section surfaces 20a and 21a.

Figure 5:
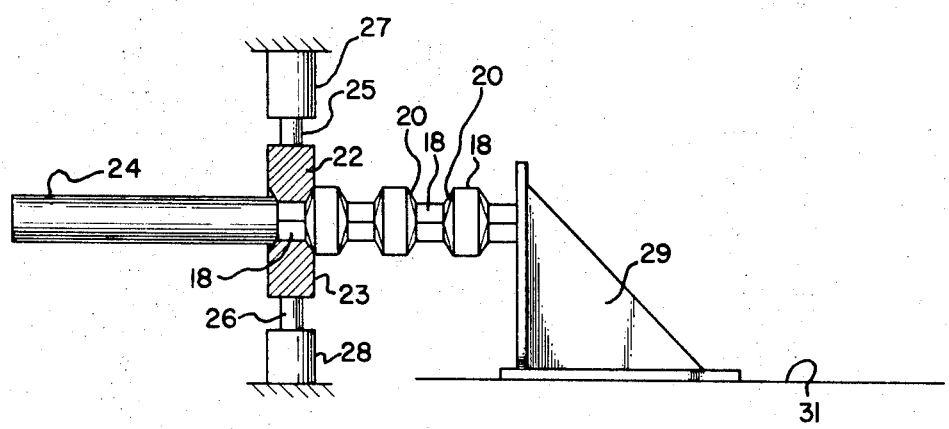
FIG. 5 is a schematic, partly sectional, side elevational view on a reduced scale illustrating the manner in which the paddle sections are progressively formed on a mixer shaft.

In FIG. 5 I have shown a preferably sand-filled tubular shaft 24 which is partially completed. The die sections 22 and 23 are respectively fixed on the piston rods 25 and 26 of fluid pressure operated cylinders 27 and 28, respectively, and are movable from an open position to the closed position shown in FIGS. 3—5. A stop member 29 is provided which may be moved along a surface 31 and anchored in a given position to assist in the forming operation.

It will be assumed that in FIG. 5 a shaft 24 is being fabricated and accordingly the adjacent paddle sections which are angularly disposed at 90° to one another are designated 18 and the transition sections adjoining them are designated 20. The apparatus is shown in FIG. 5 in a forming position in which the dies 22 and 23 are closed, and a horizontal lenticular paddle section 18 with its major axis $a$ horizontally disposed has been formed. The next step involves the opening of the die sections 22 and 23 and the movement of the end stop 29 to the right a distance corresponding to the axial width of the die sections 22 and 23 less the axial width of one of the surfaces 22b or 23b. The stop 29 is then reanchored and the tubular annular shaft 24 is rotated 90°, whereupon die sections 22 and 23 are again closed to deform shaft 24 and form the adjacent paddle section 18 and the connecting transition section 20.

Figure 5A:
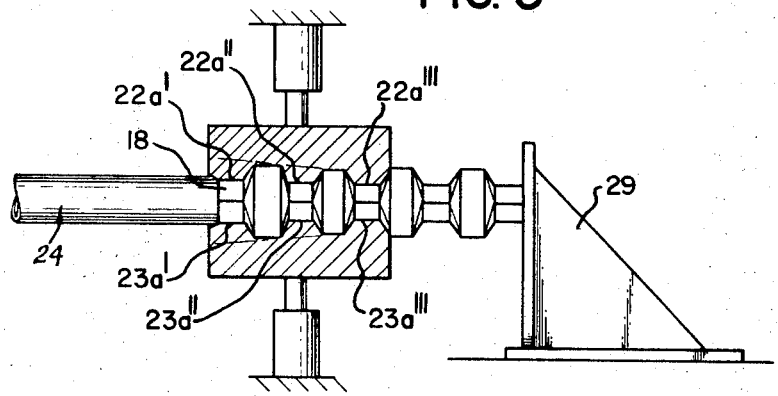
FIG. 5A illustrates an alternate method.

FIG. 5A illustrates similar apparatus wherein dies 22' and 23' have surfaces 22a' and 23a' forming cavities corresponding to the desired finished size of paddle sections 18 and surfaces 22a'', 23'' and 22a''' and 23a''' forming cavities of progressively increased size so that the forming can be progressive. The paddle-forming and transition section-forming surfaces between these surfaces 22a'—23a' and 22a''—a'' and surfaces 22a''—23a'' and 22a''' and 23a''' are also of progressively increased dimension.

Figure 6:
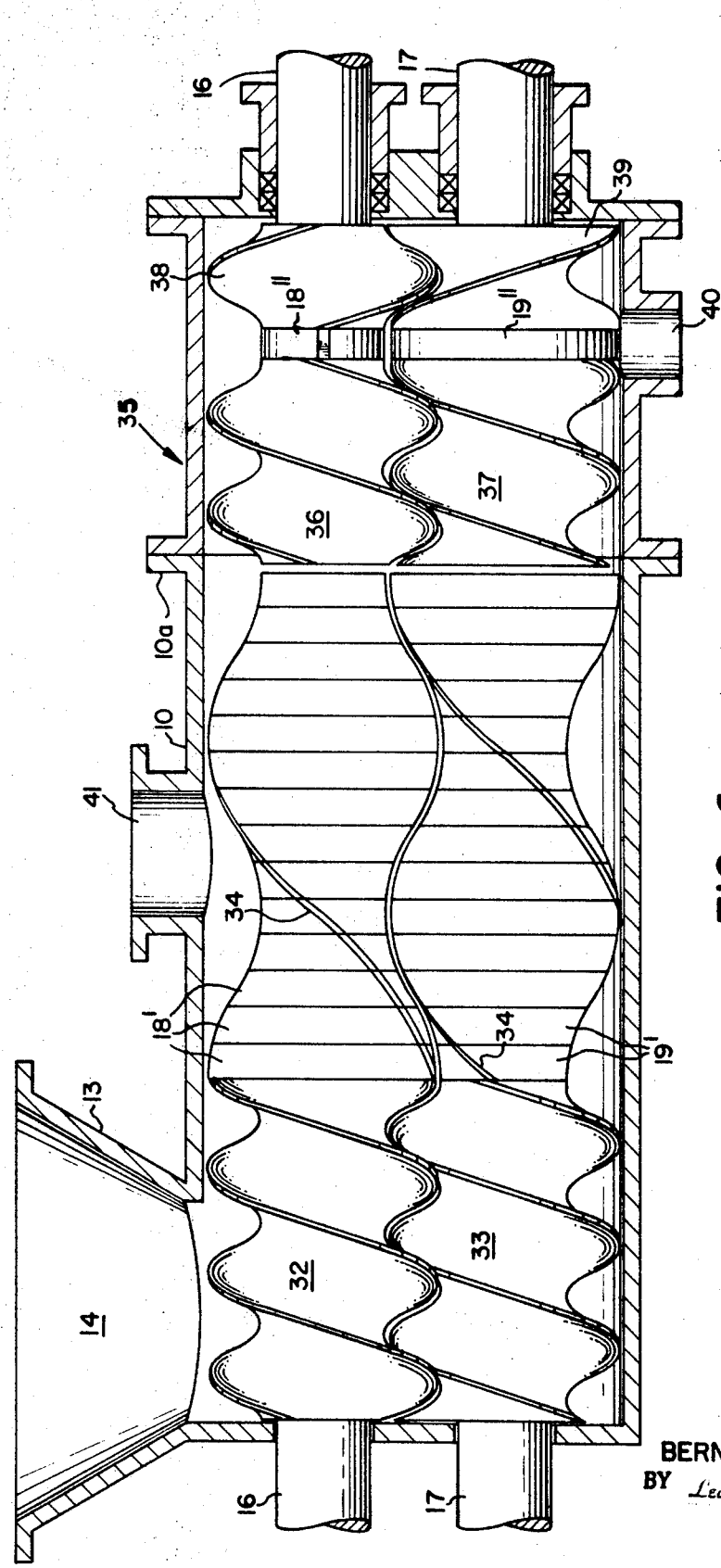
FIG. 6 is a schematic sectional, side elevational view illustrating still another construction.

In FIG. 6 I have shown still another mixing and/or kneading machine in which, again, identical numerals are used to identify parts which have been previously described. In this embodiment of the invention, advancing screw sections 32 and 33 are similarly keyed to the shafts 16 and 17, and lenticular paddles 18' and 19' are provided in a continuous helix which is not nearly as severely pitched as screw sections 32 and 33. In this embodiment of the invention the paddles 18' and 19' themselves are helically pitched and angularly offset sufficiently so that their crests 34 form continuous helices.

A discharge housing generally designated 35 and which may be bolted to the flange 10a to provide a radial discharging device for any of the embodiments of the invention is particularly useful in this embodiment of the invention. Advancing screw sections 36 and 37 are provided in the chambers 11 and 12 within the discharge casing 35 which is similarly formed in the shape of a figure 8. Reversing screw sections 38 and 39 of opposite hand are also keyed to the shafts 16 and 17 as shown and keyed to the shafts 16 and 17, between the screw sections 36—38 and 37—39 of opposite hand are a pair of nonpitched, lenticular paddle sections of the character shown at 18'' and 19'' immediately opposite a radial discharge opening 40.

Mixers of this type have been used successfully in continuous color flushing processes where a wet pigment filter cake is mixed with a vehicle such as a mineral oil, a resin or a polymer in liquid or solid particulate form. The mixing and kneading obtained disperses the pigment into the vehicle and expels the water from the filter cake. The water can be removed by suction through opening 41 in the mixer housing 10, or separated off after the discharge. The mixer housing 10 is preferably jacketed so that the mix can be heated and proper temperature conditions maintained to attain as rapid a processing as in desirable.

In operation, the material to be mixed or kneaded in each instance is fed into the charge opening 14, is mixed and/or kneaded in the chamber 10, and is discharged out opening 15 or 40. Various materials can be better mixed with certain of the mixers shown than with others. As with previous mixers of this general design, the paddle sections are self-cleaning in the sense that they continually wipe one another, and they also continually wipe the interior walls of the housing 10, so that accumulations of material do not collect on the housing or on the paddle sections. The transition sections 20 and 21 also continuously wipe one another and cause the material to move forwardly and reversely in a zigzag path which enhances the blending operation. While not shown in FIG. 1, advancing screw sections could be provided on the right ends of shafts 16 and 17 to maintain a more constant forwarding of the material in this embodiment of the mixer.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In kneading and like machines: barrel means having spaced-apart radial charge and discharge openings; at least a pair of generally axially parallel shafts extending coextensively in said barrel means between said openings; means for revolving the shafts at the same speed and in the same direction of rotation; cogenerative mating feed screw sections on said shafts at said charge opening; pairs of radially extending, mating, cogenerative, axially abutting paddles fixed on said shafts downstream from said feed screw sections and having crests at their ends which extend helically; said paddles on both shafts being progressively so angularly displaced incrementally that the paddles on each shaft form a series of full helices extending continuously which wipe the identical helices formed on the other shaft; mating cogenerative discharge screw sections provided on said shafts downstream from said helices and having portions of opposite hand separated, radially opposite said discharge opening, by at least a pair of nonpitched radially extending, mating, cogenerative paddles; the pitch of said screw sections being greater than the pitch of the helices formed by said paddles, and said barrel means being shaped so as to be completely wiped by said screw sections and paddles.

2. In kneading and like machines: barrel means having a charge opening axially spaced from a radial discharge opening; at least a pair of generally axially parallel shafts extending coextensively in said barrel means between said openings; means for revolving the shafts at the same speed and in the same direction of rotation; pairs of radially extending, mating, cogenerative, axially abutting paddles fixed on said shafts downstream from said charge opening; mating cogenerative discharge sections provided on said shafts downstream from said paddles and having portions of opposite hand separated radially opposite said discharge opening by at least a pair of nonpitched radially extending, mating, cogenerative paddles, said barrel means being shaped so as to be completely wiped by said discharge sections and paddles.

3. The combination defined in claim 2 in which cogenerative mating feed screw sections are provided on said shafts at said charge opening and said portions of opposite hand have the cross-sectional shape of said paddles and comprise a series of full helices.